(12) United States Patent
Takatsuka et al.

(10) Patent No.: US 6,524,186 B2
(45) Date of Patent: *Feb. 25, 2003

(54) GAME INPUT MEANS TO REPLICATE HOW OBJECT IS HANDLED BY CHARACTER

(75) Inventors: Susumu Takatsuka, Tokyo (JP); Kenkichi Shimooka, Tokyo (JP); Yuji Yamada, Tokyo (JP)

(73) Assignee: Sony Computer Entertainment, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/322,776

(22) Filed: May 28, 1999

(65) Prior Publication Data

US 2002/0068628 A1 Jun. 6, 2002

(30) Foreign Application Priority Data

Jun. 1, 1998 (JP) .............................. 10-151528

(51) Int. Cl.[7] .................................. A63F 13/00
(52) U.S. Cl. .............................. 463/37; 463/31; 463/43
(58) Field of Search .............................. 463/1, 2, 4, 5, 463/6, 7, 8, 23, 31, 35, 36, 37, 38, 39, 40, 41, 42, 43, 44, 46, 50, 52; 434/21, 22, 69

(56) References Cited

U.S. PATENT DOCUMENTS

| | | | |
|---|---|---|---|
| 4,672,541 A | * | 6/1987 | Bromley et al. |
| 4,817,950 A | * | 4/1989 | Goo |
| 5,080,377 A | * | 1/1992 | Stamper et al. |
| 5,229,756 A | * | 7/1993 | Kosugi et al. |
| 5,239,463 A | * | 8/1993 | Blair et al. |
| 5,269,519 A | * | 12/1993 | Malone |
| 5,288,078 A | * | 2/1994 | Capper et al. |

(List continued on next page.)

FOREIGN PATENT DOCUMENTS

| | | |
|---|---|---|
| AU | 70018/96 | 4/1997 |
| AU | 25220/97 | 5/1998 |
| CA | 2184001 | 2/1997 |
| JP | 4-156875 | 5/1992 |
| JP | 9-24161 | 1/1997 |
| JP | 9-50539 | 2/1997 |

OTHER PUBLICATIONS

Virtual Pool instruction Manual, 1996.*
Links 386 CD Players Manual, 1995.*
Gamest Mook vol. 112 The Best Game 2 (Japan) K.K. Shinseisha, 17. 01. 98).

*Primary Examiner*—Michael O'Neill
(74) *Attorney, Agent, or Firm*—Katten Muchin Zavis Rosenman

(57) ABSTRACT

An entertainment system and a recording medium on which a system is recorded that makes it possible for a character in a game space to handle an object so that a player can make with respect to an operation device of the entertainment system a movement that is related to the actual way an object is handled. A game is played in the entertainment system in accordance with this program. Commands by a player are input from an input operation system. Mounted in an optical disk device built into an optical disk controller of the entertainment system is a CD-ROM on which is recorded a program by which, using his fingers, the player moves operation parts of the input operation device with movements which are related to the way in which objects are actually handled by characters in a game space, thereby analogously moving the object of the character in the game space in two directions. A control system controls the actions of player characters on a display screen based on the program from the CD-ROM and commands from the input operation system.

19 Claims, 21 Drawing Sheets

U.S. PATENT DOCUMENTS

| | | | |
|---|---|---|---|
| 5,435,554 A | * | 7/1995 | Lipson |
| 5,442,168 A | * | 8/1995 | Gurner et al. |
| 5,551,693 A | * | 9/1996 | Goto et al. |
| 5,556,107 A | * | 9/1996 | Carter ..................... 463/35 |
| 5,616,078 A | * | 4/1997 | Oh |
| 5,643,087 A | * | 7/1997 | Marcus et al. |
| 5,649,861 A | * | 7/1997 | Okano et al. |
| 5,692,956 A | * | 12/1997 | Rifkin |
| 5,704,837 A | * | 1/1998 | Iwasaki et al. ............. 463/38 |
| 5,734,370 A | * | 3/1998 | Skodlar |
| 5,833,549 A | * | 11/1998 | Zur et al. |
| 5,853,327 A | * | 12/1998 | Gilboa |
| 5,903,257 A | * | 5/1999 | Nishiumi et al. |
| 5,913,727 A | * | 6/1999 | Ahdoot |
| 5,919,092 A | * | 7/1999 | Yokoi et al. ................ 463/37 |
| 5,931,734 A | * | 8/1999 | Nakatani et al. ........... 463/23 |
| 5,933,152 A | * | 8/1999 | Naruki et al. |
| 5,971,853 A | * | 10/1999 | Kataoka et al. ............. 463/36 |
| 5,989,123 A | * | 11/1999 | Tosaki et al. |
| 6,010,405 A | | 1/2000 | Morawiec |
| 6,028,593 A | * | 2/2000 | Rosenberg et al. |
| 6,030,290 A | * | 2/2000 | Powell |
| 6,132,314 A | * | 10/2000 | Aiki |
| 6,162,123 A | * | 12/2000 | Woolston |
| 6,171,187 B1 | * | 1/2001 | Audebert et al. |
| 6,200,219 B1 | * | 3/2001 | Rudell et al. |
| 6,217,444 B1 | * | 4/2001 | Kataoka et al. |
| 6,220,963 B1 | * | 4/2001 | Meredith |
| 6,227,968 B1 | * | 5/2001 | Suzuki et al. |
| 6,227,974 B1 | * | 5/2001 | Eilat et al. |
| 6,251,015 B1 | * | 6/2001 | Caprai |
| 6,312,335 B1 | * | 11/2001 | Tosalki et al. |
| 6,368,217 B2 | * | 4/2002 | Kanno et al. |

* cited by examiner

CASE OF MAGIC PUNCH

CASE OF SLINGSHOT

CASE OF FLYING DRAGONFLY

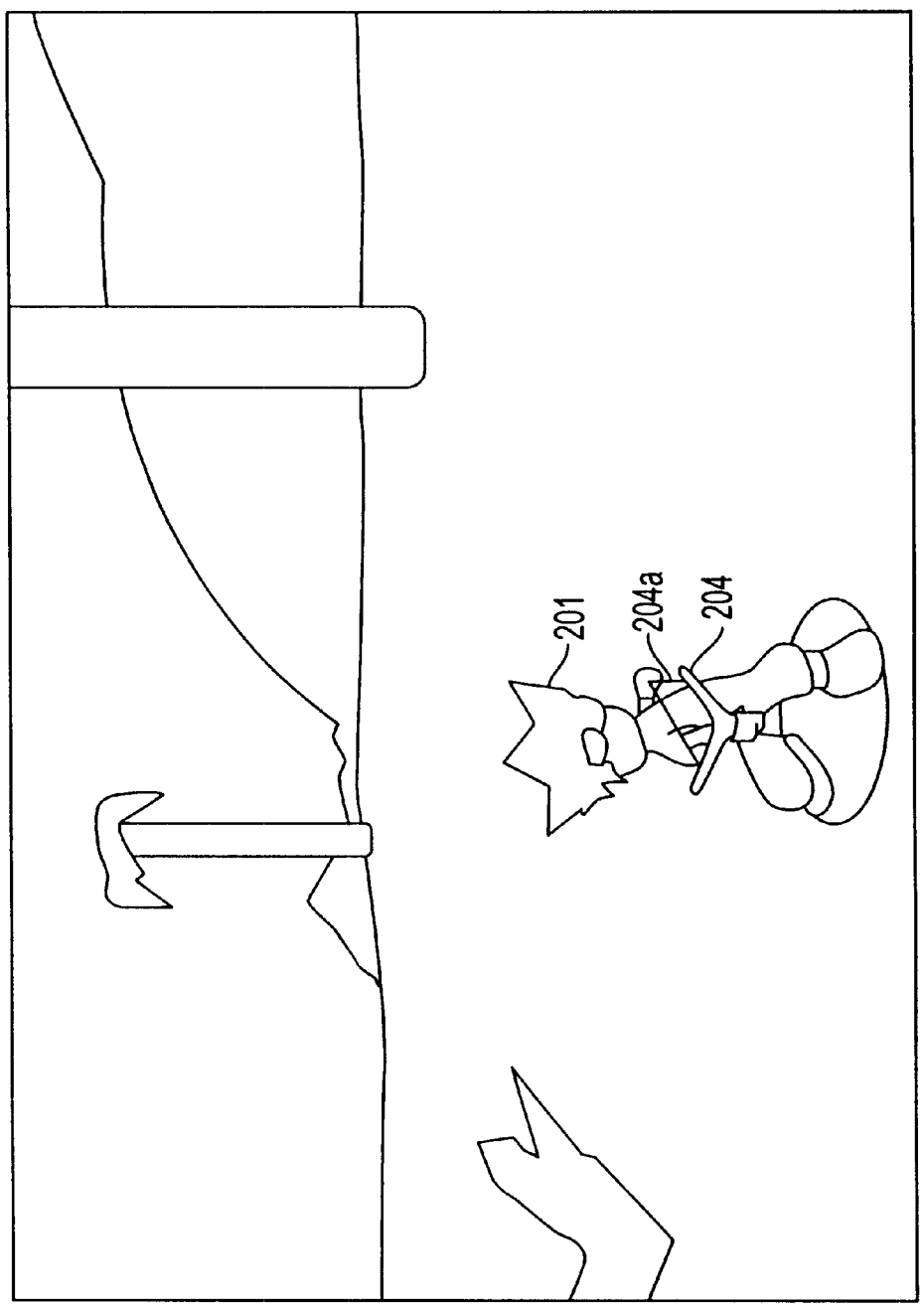

CASE OF RADIO CONTROLLER

CASE OF HULA HOOP

CASE OF CLUB

GAME INPUT MEANS TO REPLICATE HOW OBJECT IS HANDLED BY CHARACTER

BACKGROUND OF THE INVENTION

1. Field of the Invention

The invention relates to a recording medium on which a program is recorded, which makes it possible for characters in a game space to handle objects, and an entertainment system that plays the game according to the program.

2. Description of the Prior Art

Conventionally, a game machine that employs a television receiver has a game machine main unit that is connected to the television receiver, which is used as a display device, and an operation device which is connected to the game machine main unit by a connection cable and controls the display characters displayed on the display screen of the television receiver.

Built into the main unit that comprises the game machine are a disk drive unit which plays a recording medium, for example, an optical disk, on which the game program is recorded, and an image processing device, etc. for displaying display characters, together with the background screen, on the screen of the television receiver in accordance with the game program recorded on the optical disk.

Multiple operation parts are arranged on the operation device that is connected to the game machine main unit. By manipulating the multiple operation parts provided on the operation device, the user inputs to the image processing device instruction information concerning the actions of display characters to be displayed on the display screen of the television receiver, and controls the direction of movement of the display character, etc. according to the instruction information, thereby playing the game.

The operation device used in a game machine of this type is used held in the hands and fingers of the player. Arranged on one side of the device main unit is a direction instruction operation unit having a direction instruction operation button in a + or circular shape, and arranged on the other side of the machine main unit is a function setting and execution unit having multiple function setting and execution buttons which set the action functions of the display character or execute the actions. The direction instruction operation unit has four switches, arranged in mutually perpendicular directions, equipped with operation parts that connect and disconnect with contacts. The display character is moved by selectively turning these switches on and off by means of a direction instruction operation unit that has a + or circular shape. For example, among the four switches arranged in mutually perpendicular directions, the display character is made to move digitally in the direction in which the switches that are turned on are arranged. In the function setting and execution unit, switches are arranged corresponding to multiple function setting and execution operation parts, and by turning on the switch that corresponds to a function setting and execution operation part, the function of the display character assigned to each button is set, or the function that the display character has is executed.

In a direction instruction operation unit of the above-described operation device, only instruction signals are given that cause movement operations in the direction in which the switches that are turned on are arranged, among the four switches arranged in mutually perpendicular directions, and thus it is impossible to give command information that would cause a display character to rotate or to change the direction of its gaze while moving forward. This makes it difficult to construct game programs using display characters that perform a variety of actions.

With the switches that constitute the direction instruction operation unit, by on/off operation by operating the direction instruction operation unit, one can only give instruction information that controls the movement of the display character, with the result that the movement of the display character is intermittent, and it is impossible to cause a continuous series of movements.

Thus operation devices have been proposed that have an operation unit that makes it possible to input command signals that make it possible for a display character to move while rotating, or to move while varying its speed, or to make movements in which its shape is made to change.

One operation device of this type is described in unexamined Japanese patent application publication H7-88252 [1995].

Recently there has been a desire to have games that simulate human actions more closely, by allowing characters in game space to hold objects such as weapons or tools, and playing the game while allowing them to handle such objects with fine movements.

But playing a game while allowing characters to handle objects is done by having the player manipulate the operation device, which makes the user interface more complicated.

SUMMARY OF THE INVENTION

It is an object of the present invention, to avoid disadvantages of the above described prior art and provide a recording medium on which a program is recorded, which allows characters in a game space to handle objects by having the player perform on the operation device a movement that is related to the way in which the object would actually be handled, and an entertainment system that plays the game in accordance with the program recorded on the recording medium.

These and other objects of the invention are attained by recording medium on which a program is recorded that advances a game by causing prescribed characters on a display screen to perform actions according to wishes of a player by an input operation device, wherein the recorded program makes enables an object of a character to move in a game space analogously in two dimensions by having the player move with his fingers the operation parts of the input operation device by movements that are related to how the object is actually handled.

The objects of the present invention are also attained by an entertainment system in which a player plays the game by causing a prescribed character on a display screen of th e entertainment system to act as intended, comprising an input operation means by which commands by the player are inputted; a memory medium for storing a program that makes it possible to cause characters in a game space to handle objects by having the player make with his fingers on said input operation means movements that are related to how an object is actually handled; and a control means for controlling the actions of player characters on the display screen based on said program stored in said memory medium and commands from said input operation means.

The control means analogously moves said object. by detecting the amount of two-dimensional movement of an operation part of the input operation means.

This ability to provide the operation of the input operation means that is related to the actual operation of the object can improve the user interface.

BRIEF DESCRIPTION OF THE DRAWINGS

FIG. 17 is a diagram showing how a player character is made to hold a slingshot in an at-the-ready stance;

DETAILED DESCRIPTION OF THE PREFERRED EMBODIMENTS

Figure 1:
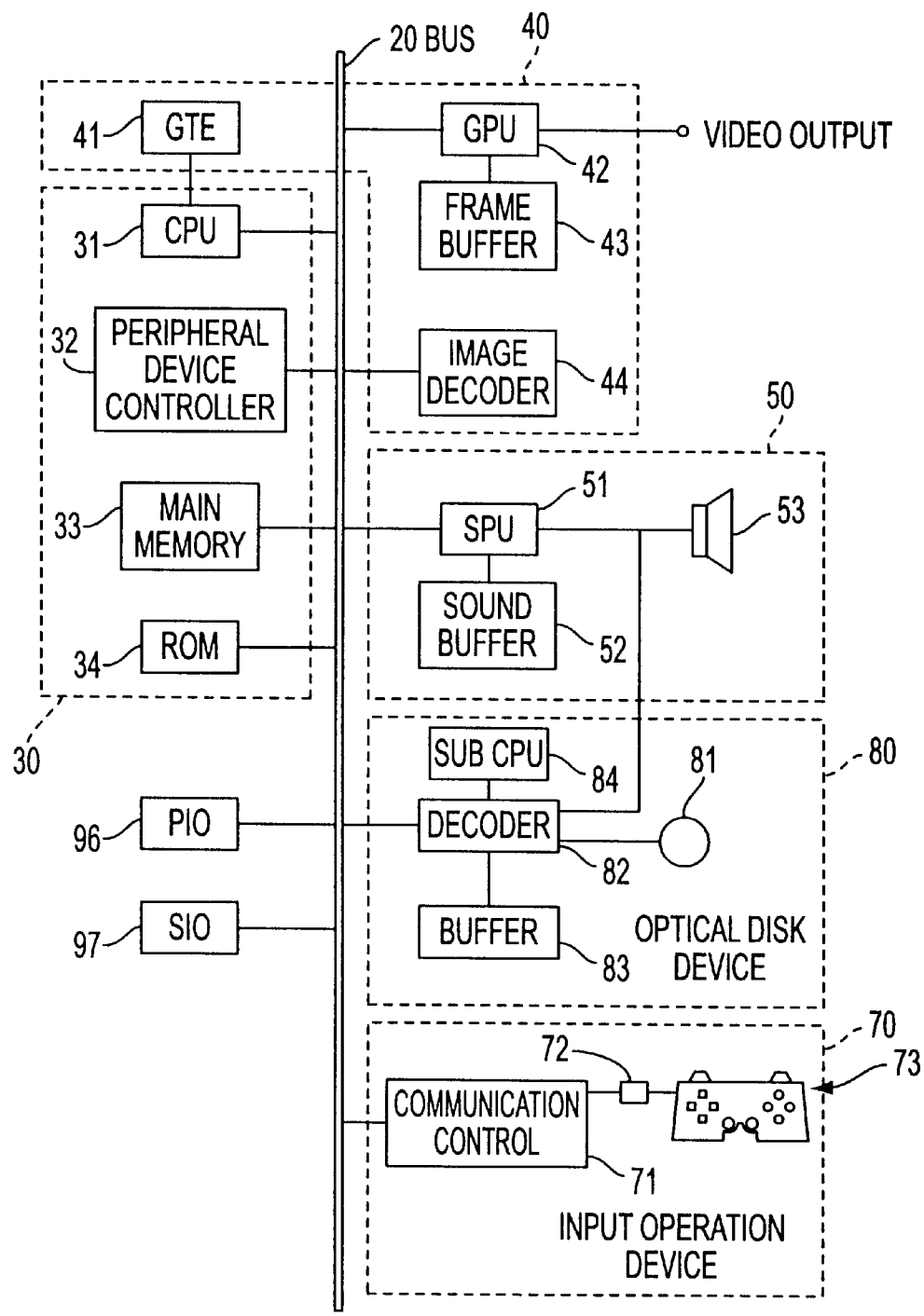
FIG. 1 is a block diagram showing the configuration of a video game device as an embodiment of the entertainment system of the present invention.

Referring now to the drawings in detail, FIG. 1 shows an embodiment of the present invention as a video game device in which in playing a game the players use an operation device to cause characters to handle objects, according to an application program recorded on the recording medium of this invention. In particular, in the video game device, characters in a game space can be made to handle objects by having the player make movements with respect to the operation device that are related to the actual ways in which objects are handled.

As shown in FIG. 1, in the video game, device 1, a graphic generation system 40, a sound generation system 50, an optical disk controller 80, and an input operation system 70 are connected to a control system 30 via system a bus (BUS) 20.

Here, commands by players are input from input operation system 70. Mounted in optical disk device inside optical disk controller 80 is a CD-ROM. on which is recorded a program by which objects of characters in game space can be moved analogously in two dimensions by having the player use his fingers to move the operation parts of said input operation device with movements that are related to the way in which the objects are actually handled. Control system 30 controls the actions of player characters on the display screen based on said program from said CD-ROM and commands from said input operation system 70.

Control system 30 has central a processing unit (CPU) 31, a peripheral device controller 32, which performs interrupt control and control including a direct memory access (DMA) transfer, a RAM 33, which serves as the main memory, and a read-only memory (ROM) 34, in which are stored programs for the so-called operating system, etc., which manages graphic generation system 40, a sound generation system 50, etc.

CPU 31, which controls this entire video game device 1 by executing programs of the operating system stored in ROM 34, consists of, for example, a 32-bit RISC CPU. The composition and operation of this CPU 31 are described in detail below.

When the power is turned on in this video game device 1, CPU 31 of control system 30 controls graphic generation system 40, sound generation system 50, etc. by executing operating system programs stored in ROM 34. When the operating system programs are executed, CPU 31 initializes the entire video game device 1, including operation confirmation, then controls optical disk controller 80 and executes the game or other application program stored on the optical disk. By execution of this game or other application program, CPU 31 controls graphic generation system 40, sound generation system 50, etc. and controls the display of images and the generation of sound effects and tones in accordance with the input from the player.

Graphic generation system 40 has a geometry transfer engine (GTE) 41, which performs coordinate conversion and other processing, a graphic processing unit (GPU) 42, which draws in accordance with drawing instructions from CPU 31, a frame buffer 43, which records the image drawn by this GPU 42, and an image decoder 44, which decodes image data compressed and encoded by an orthogonal transform such as a discrete cosine transform.

The GTE 41 has, for example, a parallel operation mechanism that executes multiple operations in parallel, and can perform at high speed such operations as coordinate conversion, light source calculations, and matrix or vector operations in response to operation requests from the CPU 31. Specifically, in the case, for example, of an operation in which flat shading is drawn with the same color in a polygon in the shape of one triangle, GTE 41 can do coordinate calculations for up to 1.5 million polygons per second, and thus with this video game device the load on CPU 31 can be reduced and high-speed coordinate operations can be done.

The GPU 42 draws polygons to frame buffer 43 in accordance with drawing commands from CPU 31. The GPU 42 can draw up to 360,000 polygons per second.

The frame buffer 43 consists of a so-called dual-port RAM and can simultaneously perform transfer from the drawing from GPU 42 or from the main memory, and reading for display. The frame buffer 43 has a capacity of, for example, 1 Mbyte, and is handled as a matrix consisting of 1024 pixels horizontally and 512 pixels vertically, each of 16 bits. Provided in the frame buffer 43 are a display region that is displayed as video output, a CLUT region in which is stored a color look-up table (CLUT) that is referenced when GPU 42 draws polygons, and a texture region in which is stored the texture mapped into the polygons, etc. drawn by GPU 42, coordinate-converted at the time of drawing. These CLUT and texture regions change dynamically in accordance with changes in the display region.

Besides the above-described flat shading, said GPU 42 can do Gouraud shading, in which the color inside a polygon is determined by interpolation from the colors of the polygon vertices, and texture mapping, in which the texture stored in the aforesaid texture region is laid onto a polygon. If such Gouraud shading or texture mapping is done, said GTE 41 can perform coordinate operations for up to 500,000 polygons per second.

Image decoder 44, under control from said CPU 31, decodes still picture data or moving picture data stored in main memory 33 and stores it into main memory 33.

By storing the played-back image data in frame buffer 43 via GPU 42, it can be used as background for the image drawn by the aforesaid GPU 42.

Sound generation system 50 includes a sound processing unit (SPU) 51, which generates tones and sound effects based on instructions from CPU 31, a sound buffer 52, which stores the tones and sound effects generated by the SPU 51, and a speaker 53, which outputs (emits) the tones and sound effects generated by SPU 51.

SPU 51 has an ADPCM decoding function that plays back audio data in which, for example, 16-bit audio data is subjected to adaptive differential pulse coded modulation (ADPCM) as 4-bit difference signals, a playback function that generates sound effects, etc. by playing back the waveform data stored in sound buffer 52, and a modulation function that modulates and plays back waveform data stored in sound buffer 52.

Equipped with such functions, this sound generation system 50 makes it possible to play back tones and sound effects, etc. based on the waveform data stored in sound buffer 52 according to instructions from CPU 31, that is, to use them as sampling sound sources.

The optical disk controller 80 has an optical disk device 81, which plays back programs or data stored on an optical disk, a decoder 82, which decodes programs or data stored with, for example, an error correction code (ECC) added to them, and a buffer 83, which makes it possible to read data from the optical disk at high speed by temporarily storing the data from optical disk device 81. Connected to the decoder 82 is sub CPU 84.

The audio data stored on optical disk that is read by optical disk device 81 includes, besides the aforesaid ADPCM data, so-called PCM data, in which an audio signal is subjected to analog/digital conversion.

As ADPCM data, audio data in which the difference of, for example, 16-bit digital data is expressed and recorded by 4 bits is decoded by decoder 82, then is supplied to aforesaid SPU 51, and after digital/analog conversion or other processing is done on it by SPU 51, it is used for driving speaker 53.

As PCM data, audio data recorded as, say, 16-bit digital data is decoded by decoder 82 and is then used for driving speaker 53.

Optical disk device 81 reads from a CD-ROM, which serves as a specific example of the recording medium of this invention, an application program that allows characters in game space to wield objects by having the player make on the operation device a motion that is associated with the actual way the object would be handled. Then decoder 82 decodes the application program.

Input operation system 70, which is an input means by which the player inputs instructions, includes an input operation device 73, which has an operation lever or a set of pushbuttons. In the field that deals with game devices, the input operation device 73 is generally known as a controller. Also, input operation system 70 includes a communication controller 71, which controls communication with CPU 31 via bus BUS 20, and a connection unit 72, to which input operation device 73 is connected.

In order to input instructions from the user, input operation device 73, which is connected to the connection unit 72, has, for example, 16 instruction keys, and the state of these instruction keys is transmitted by synchronous communication to communication controller 71 about 60 times per second. Communication controller 71 transmits the state of the instruction keys of input operation device 73 to CPU 31.

When the video game device 1 is activated by a player operation via the input operation device 73, CPU 31 of control system 30 reads the application: program from optical disk device 81 of optical disk controller 80 via system bus 20, stores it in main memory 33, and begins execution.

When execution of the application program is begun, graphic generation system 40 generates a video signal for this game's background and player characters, and the objects that player characters will manipulate. This video signal is output to a monitor not shown, and images of the background and the player characters and objects are displayed on the display screen of the monitor.

By start of execution of said application program, sound generation system 50 generates tones and sound effects, etc. and emits them from speaker 53.

When the player operates the operation lever or set of pushbuttons on input operation device 73 of input operation system 70, the corresponding command is input to CPU 31 via system bus 20, and CPU 31 controls graphic generation system 40 so that the player character on the display screen of the monitor carries out actions corresponding to the player operations. Also, CPU 31 controls sound generation system 50 and causes various sound effects and tones, etc. to be emitted from speaker 53.

Figure 2:
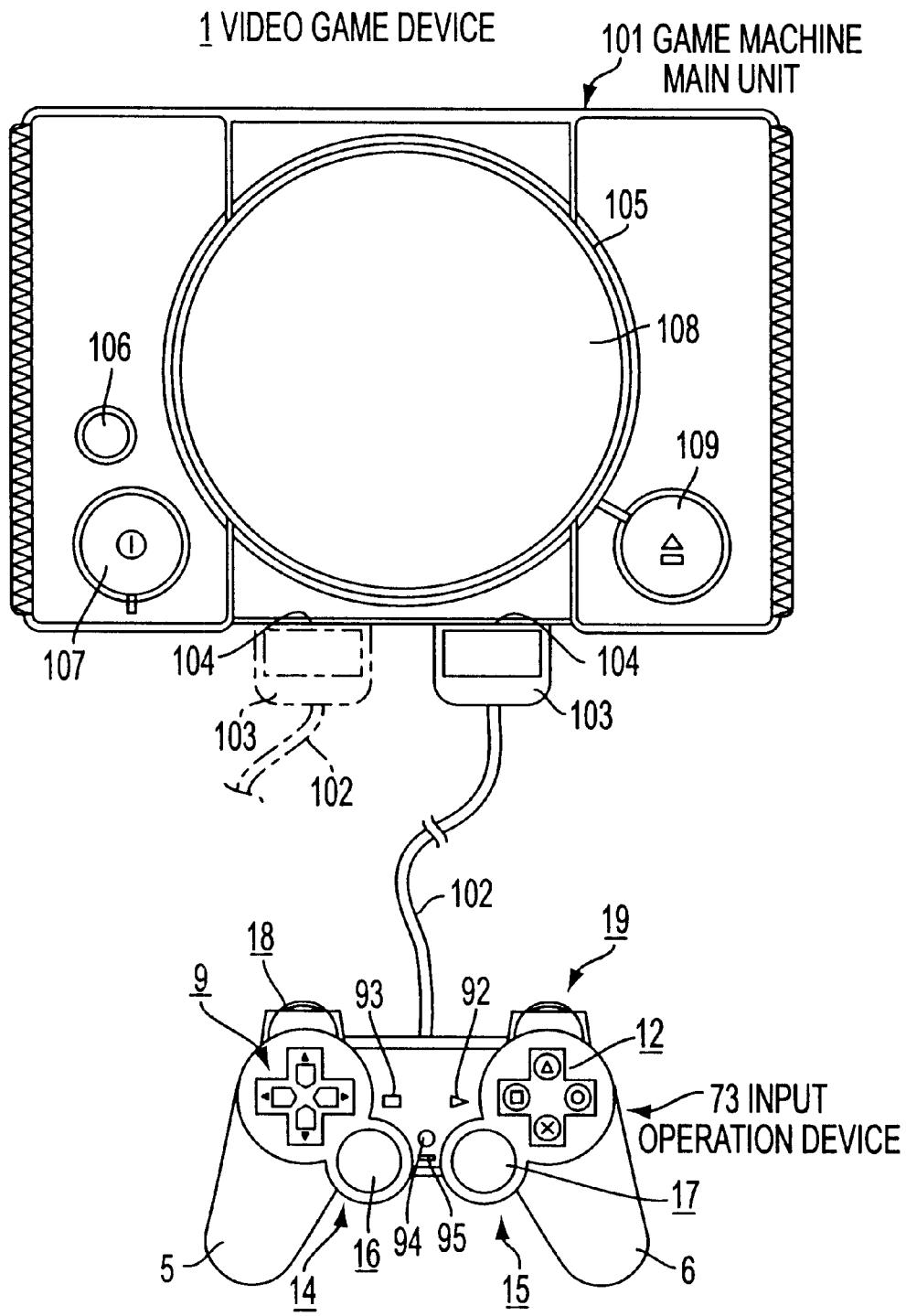
FIG. 2 is a plan view of the video game device of FIG. 1.

FIG. 2 is a view, from above, of the state of connection between the game machine main unit 101 and the input operation device 73 in the video game device 1.

The connection of input operation device 73 to game machine main unit 101 is done via a connection cord 102, which is pulled out from the middle of the front side of device main unit 101. The connection cord 102 has a connector 103 on its end, and input operation device 73 is connected to game machine main unit 101 by connecting connector 103 to a jack 104, which is provided on the one side of game machine main unit 101.

Game machine main unit 101 of video game device 1 is housed in a roughly rectangular cabinet, and is equipped with and consists of, in its middle, a disk mounting unit 105 in which is mounted a CD-ROM or other optical disk that is the recording medium for supplying the aforesaid application program, a reset switch 106 for arbitrarily resetting the game, a power switch 107, a cover 108 of disk mounting unit 105, a cover opening switch 109 for opening the cover 108, and, for example, two jacks 104. Two input operation devices 73 can be connected to jacks 104, allowing two users to play games, etc.

Figure 3:
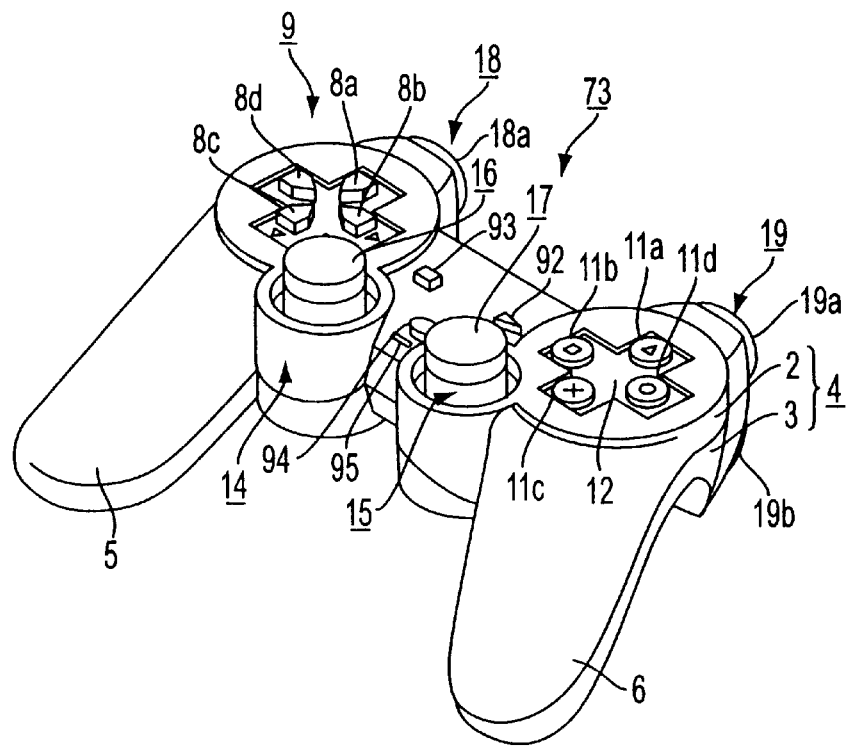
FIG. 3 is a perspective view of the input operation device that includes the video game device of FIG. 1.

As shown in FIG. 3, input operation device 73 includes a device main unit 4 in which an upper half 2 and a lower half 3 abut each other and are joined using screws or other fastening means. Protruding from one side of each end of device main unit 4 are a first holding part 5 and a second holding part 6, which are held between the palms of the left and right hands when this input operation device 73 is connected to the game machine main unit 101 and the game is executed. The first and second holding parts 5 and 6 are separated from each other facing toward the ends and protrude so that they face downward in device main unit 4. In order to make it possible to hold first and second holding parts 5 and 6 over a long period of time, they are shaped so as to narrow from the side of the part that connects with device main unit 4 to the end side, the circumferential surface is an arc surface, and the end side is shaped like an arc.

Arranged on one end of device main unit 4 is a first operation unit 9, in which the four, first through fourth, push operation parts 8a, 8b, 8c, 8d, which protrude on the upper surface of device main unit 4, are arranged mutually perpendicularly. Push operation parts 8a, 8b, 8c, 8d that constitute the first operation unit 9 are formed integrally on a rotation operation member so that the center portion is supported rotatably, and are arranged in mutually perpendicular directions about the center of rotation of the rotation operation member. That is, first through fourth push operation parts 8a, 8b, 8c, 8d are integrally linked to each other. Switch elements are provided on first operation unit 9 as signal input elements that each correspond to first through fourth push operation parts 8a, 8b, 8c, 8d. First operation unit 9 functions, for example, as a direction instruction control unit that controls the movement of a display character, and by selectively pressing first through fourth push operation parts 8a, 8b, 8c, 8d and turning the switch elements that correspond to these push operation parts 8a, 8b, 8c, 8d on and off, the display character is caused to move in the direction of the arrangement of the pressed push operation parts 8a, 8b, 8c, 8d.

Arranged on the other end of device main unit 4 is a second operation unit 12, in which the four, first through fourth, push operation parts 11a, 11b, 11c, 11d, which protrude on the upper surface of device main unit 4, are arranged mutually perpendicularly. The push operation parts 11a, 11b, 11c, 11d are each formed as an independent member, and switch elements are provided as signal input elements that each correspond to one of the push operation parts 11a, 11b, 11c, 11d. Second operation unit 12 is used as a function setting execution unit that sets the function of a display character allocated to each of push operation parts 11a, 11b, 11c, 11d, or executes the function that a display character has, by turning on switches that correspond to first through fourth push operation parts 11a, 11b, 11c, 11d.

Also, on the input operation device 73, third and fourth operation units 14 and 15 are arranged in opposite corners on the side. of the part that joins to device main unit 4, on the base part side of first and second holding parts 5 and 6. The third and fourth operation units 14 and 15 have rotation operation parts 16 and 17 that can be rotated 360° about the operation axis, and variable-resistance elements or other signal input elements that are operated by these rotation operation parts 16 and 17. That is, rotation operation parts 16 and 17 are attached to the end of an operation axis attached so that they are restored to the central position by an impelling member, and they are rotated 360° about the rotation fulcrum of the operation axis. The third and fourth operation units 14 and 15 are used as operation units that make it possible, by rotation operation of rotation operation parts 16 and 17, to cause display characters to move while rotating, or to cause them to move while varying their speed, and make it possible to input instruction signals that allow analog movements such as changing forms. They are also used as operation units for moving character objects analogously in two dimensions by association with the way an object is actually handled by a player.

Figure 4:
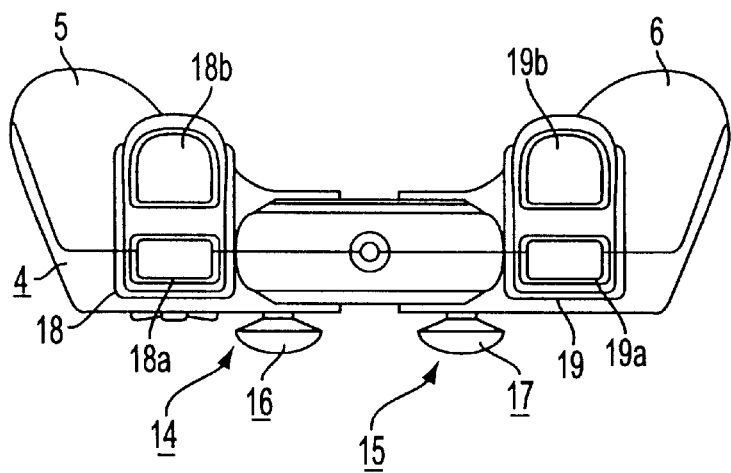
FIG. 4 is a side view of the input operation device of FIG. 3.

Also, fifth and sixth operation units 18 and 19 are arranged and positioned on the left and right ends of the front surface opposite the back side that is one side on which first and second holding parts 5 and 6 of device main unit 4 protrude. As shown in FIG. 4, fifth and sixth operation units 18 and 19 have respectively first and second push operation parts 18a, 18b and 19a, 19b. Provided on these push operation parts 18a, 18b and 19a, 19b are switch elements that correspond to push operation parts 18a, 18b and 19a, 19b, respectively. Fifth and sixth operation units 18 and 19 are used as a function setting and execution unit that sets the functions of display characters assigned to push operation parts 18a, 18b and 19a, 19b or executes the functions that display characters have, by, for example, turning on the switches that correspond to first and second push operation parts 18a, 18b and 19a, 19b.

Referring back to FIG. 3, arranged in a row on the input operation device 73, positioned between first operation unit 9 and second operation unit 12 on the top surface of device main unit 4, are a start switch 92, which gives the instruction to begin the game, and a selector switch 93, which selects the degree of difficulty of the game when the game is started. Provided positioned between third operation unit 14 and fourth operation unit 15 on the top surface of device main unit 4 are a mode selection switch 94, which selects the operation mode of third and fourth operation units 14 and 15, and a display unit 95, which displays the state of the operation mode of third and fourth operation units 14 and 15. The display unit 95 consists of a light-emitting element such as a light-emitting diode. By switching operation of mode selection switch 94, one can for example select an operation mode in which input of instruction signals from third and fourth operation units 14 and, 15 is enabled, or an operation mode in which input of instruction signals form third and fourth operation units 14 and 15 is prohibited, and in addition one may enable input of instruction signals from third and fourth operation units 14 and 15 and select an operation mode in which switching is done between the functions of first through fourth push operation parts 11a, 11b, 11c, 11d of second operation unit 12 and the functions of first and second push operation parts 18a, 18b and 19a, 19b of fifth and sixth operation units 18 and 19. In accordance with the state of these operation modes, display unit 95 lights up and goes out, and the display light changes.

Rotation operation parts 16 and 17 can rotate 360° 0 about their operation axis. When rotation operation parts 16 and 17 are rotated by the user, CPU 31, which is built into control system 30 shown in the aforesaid FIG. 1, acquires the input data generated by the movement of each rotation operation part and determines the action pattern according to the input data. After setting the motion of the action pattern, it manipulates the character by controlling the drawing processing.

Figure 5:
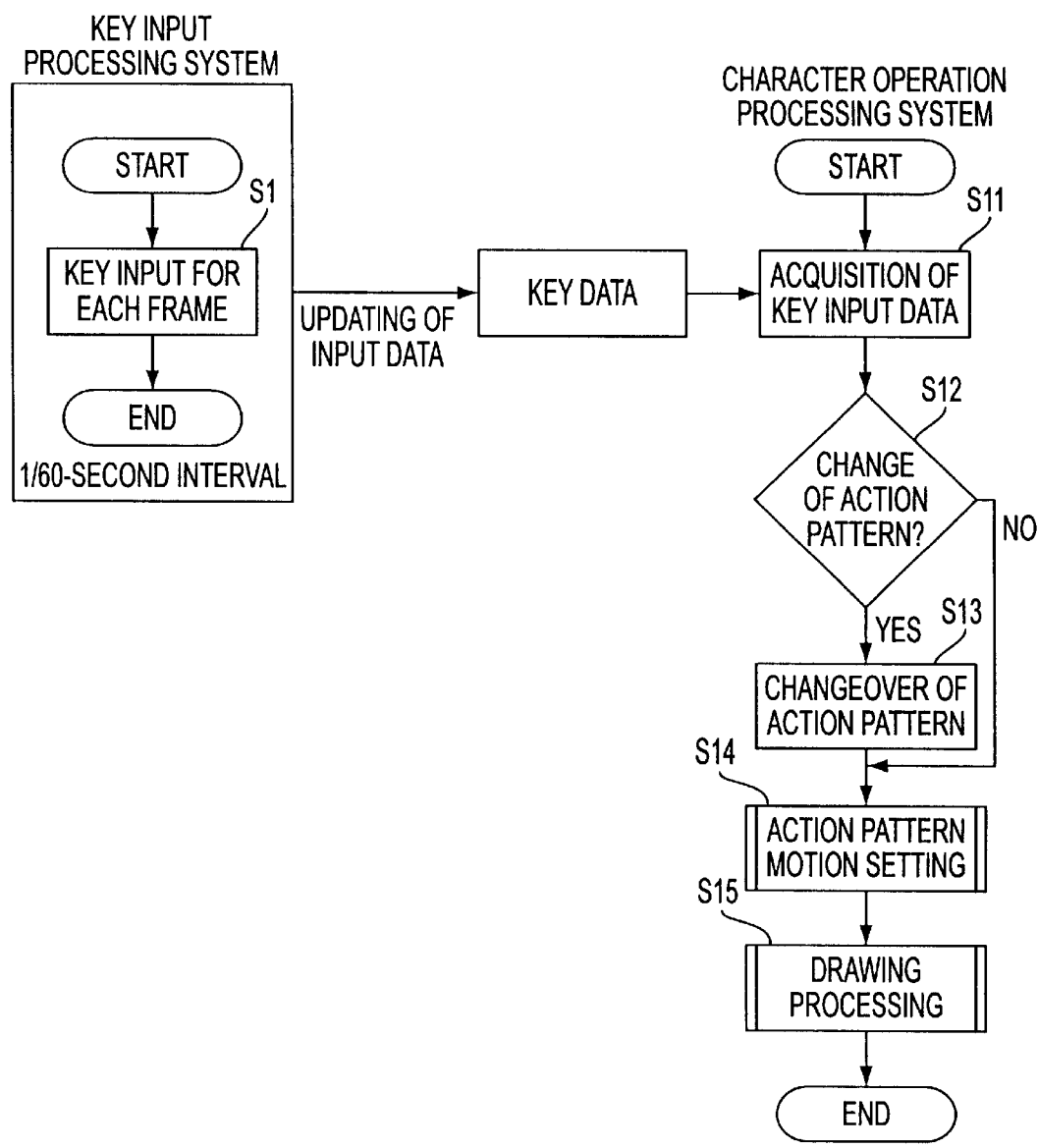
FIG. 5 is a flowchart for explaining the series of processing by the CPU which includes a control system of the video game device of FIG. 1.

The processing done by the CPU 31 is illustrated in the flowchart of FIG. 5. In the following, the explanation proceeds on the assumption that rotation operation part 16 is the left stick, and rotation operation part 17. is the right stick.

First, in step S1 of the key input processing system, CPU 31 monitors the key input of each frame from the left stick, right stick, or another switch unit, in intervals of 1/60 second. Here the key data is judged by the fact that the input data is updated. This key data is acquired as key input data in step S11 of the character operation processing system.

The acquisition of key input data in step S11 in this character operation processing system is explained below using FIGS. 6 and 7.

Figure 6A:
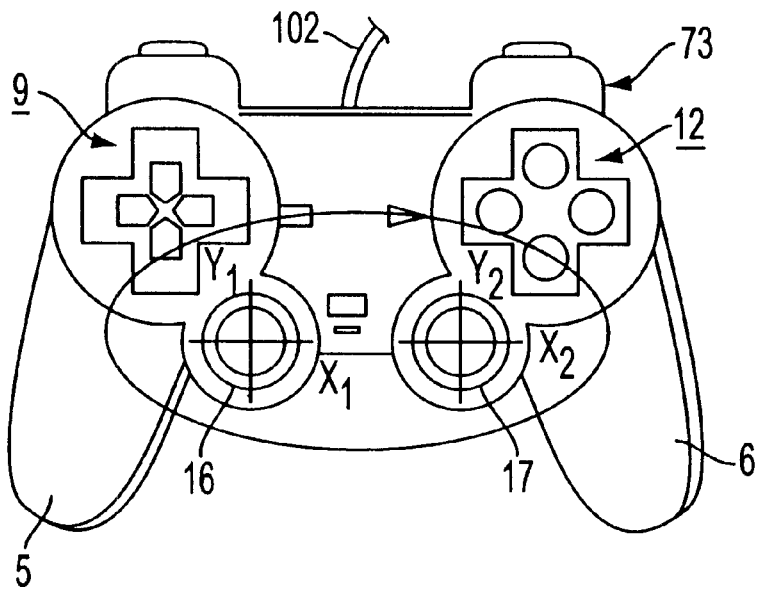
FIGS. 6(a–b) show an input operation device and a diagram of the movement of the rotation operation part of the input operation device for explaining the acquisition and processing of key input data in the character operation processing system in the flowchart of FIG. 5.
Figure 6B:
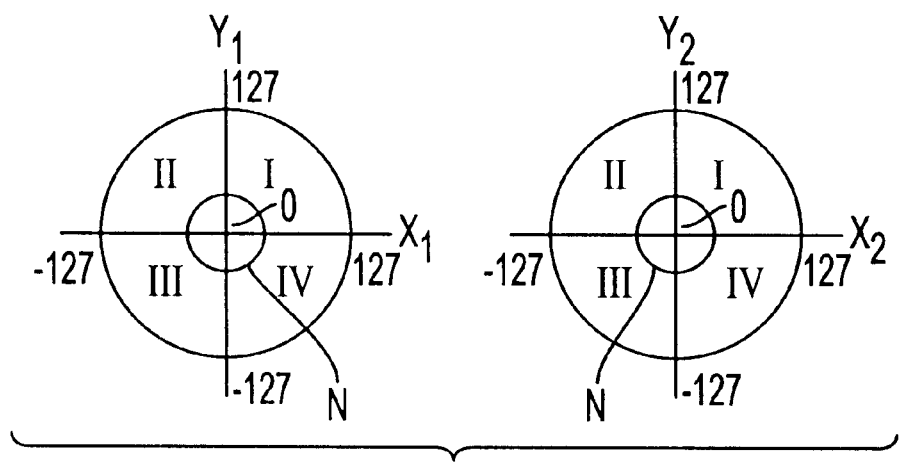

First, as shown in (a) of FIG. 6, a coordinate range is set to Y1 and Y2 in the vertical direction and X1 and X2 in the horizontal direction of rotation operation parts 16 and 17, respectively, and one looks to see how far each rotation operation part has moved in the plus or minus direction about the center within each coordinate range. For example, in (b) of FIG. 6, the coordinate range is set with 127 taken in the plus and minus directions from each center, and the movement of each rotation operation part is watched.

Specifically, when the rotation operation parts 16 and 17 are in the neutral position, CPU 31 sets them to initial position 0, and measures the position in which the operation part is tilted 127 each time up, down, left, and right. Neutral region N is set in a specified range from initial position 0 within this coordinate range. Also, first quadrant I, second quadrant II, third quadrant III, and fourth quadrant IV are set.

The direction in which the rotation operation part is tilted and the extent of its tilt are detected from the coordinates to which the stick is tilted. Also, the speed at which the rotation operation part is tilted is detected by the movement position of the coordinates within a prescribed time. That is, the movement of each rotation operation part in a 1/60-second interval is detected, and the position of the stick in each frame is obtained as key data. Also, the input angle of each rotation operation part is detected as the vector product of the coordinate movement point within a prescribed time.

The rotation of each rotation operation part is detected by checking whether the coordinate movement point passes through each quadrant in order.

Figure 7:
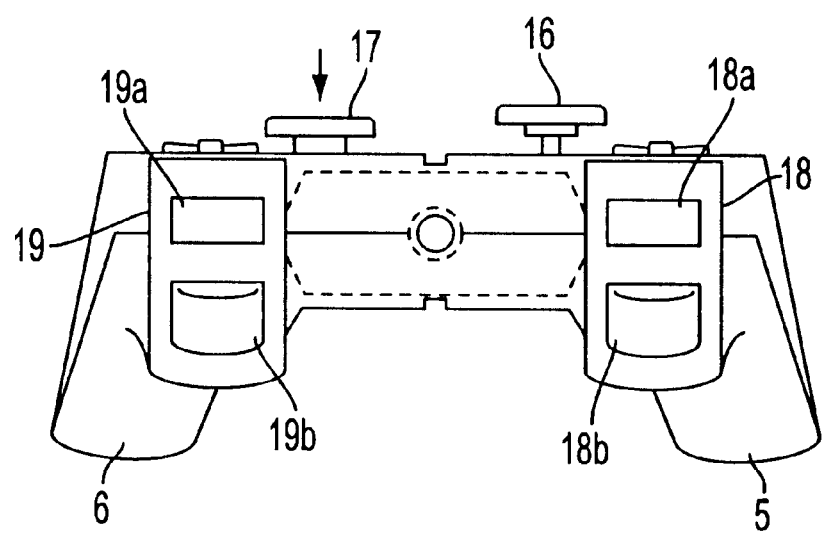
FIG. 7 is a diagram showing the pushing in of the rotation operation part of the input operation device for describing the acquisition and processing of key input data in the character operation processing system in the flowchart shown in the above FIG. 5.

Rotation operation parts 16 and 17 have a structure in which they are pushed in downward, so when for example the user pushes in rotation operation part 17 downward as shown in FIG. 7 and turns it on, the CPU 31 acquires on/off data as key data for each frame.

Next, in step S12 in FIG. 5, CPU 31 decides whether there is a change in the action pattern, and if there is, it switches the action pattern in step S13. A change in the action pattern means a switch to an object operation that is different from the object operation that the character has previously been doing. An example would be a changeover from the action of having the character brandish a stick to the action of throwing a stone.

If in step S12 there is no change in the action pattern or if in step S13 the changeover of action pattern ends, one proceeds to step S14 and sets the motion of the action pattern. This setting of the motion of an action pattern is discussed below using FIG. 8. When this action pattern motion setting comes to an end, in step S 15 graphic generation system 40 is controlled and is made to perform drawing processing.

Figure 8:
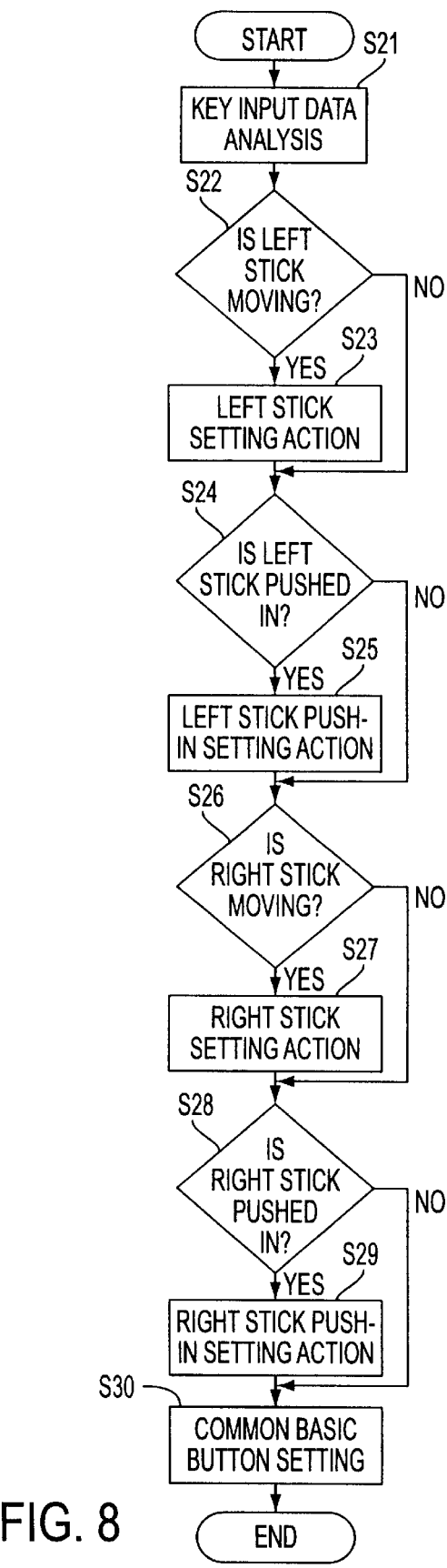
FIG. 8 is a flowchart for explaining the motion setting of moving picture patterns in the character operation processing system in the flowchart shown of FIG. 5.

Here, the details of the action pattern motion setting processing of S14 are given in FIG. 8. After analyzing the key input data in step S21, CPU 31 proceeds to step S22 and decides whether rotation operation part 16 (referred to in FIG. 8 as the left stick) is moving. If it is judged to be moving, in step S23 motion processing is set in which the character is made to perform the action set by the left stick. If it is decided that the left stick is not moving or if the setting action of the left stick ends; it proceeds to step S24, where it is decided whether the left stick is pushed in. If it is decided that it is pushed in, it proceeds to step S25 and sets motion processing for causing the character to perform the set action for which the left stick is pushed in. If the left stick is not pushed in or if the motion processing setting in step S25 ends, it proceeds to step S26.

In step S26, it is decided whether rotation operation part 17 (referred to in FIG. 8 as the right stick) is moving. If it is judged to be moving, it proceeds to step S27 and motion processing is set in which the character is made to perform the action set by the right stick. If it is decided that the right stick is not moving or if the setting action of the right stick ends, it proceeds to step S28, where it is decided whether the right stick is pushed in. If it is decided that it is. pushed in, it proceeds to step S29 and sets motion processing for causing the character to perform the set action for which the right stick is pushed in. If the right stick is not pushed in or if the motion processing setting in step S29 ends, it proceeds to step S30 and sets the common basic button.

In the processing by CPU 31 explained above with reference to FIGS. 5 through 8, an application program stored in main memory 33 is executed. This application program is part of the application program played back by optical disk device 81 of optical disk controller 80 from a CD-ROM, which is a specific example of the recording medium of this invention.

For example, we assume that on the optical disk is recorded an application program by which the player causes characters to behave as he wills. Specifically, it is an application program in which points are accumulated by fighting one's way through situations the character encounters by proceeding through a forest or plain or town, such as picking fruit from a tree, flying through the air, or driving off an attacking bird monster.

Figure 9:
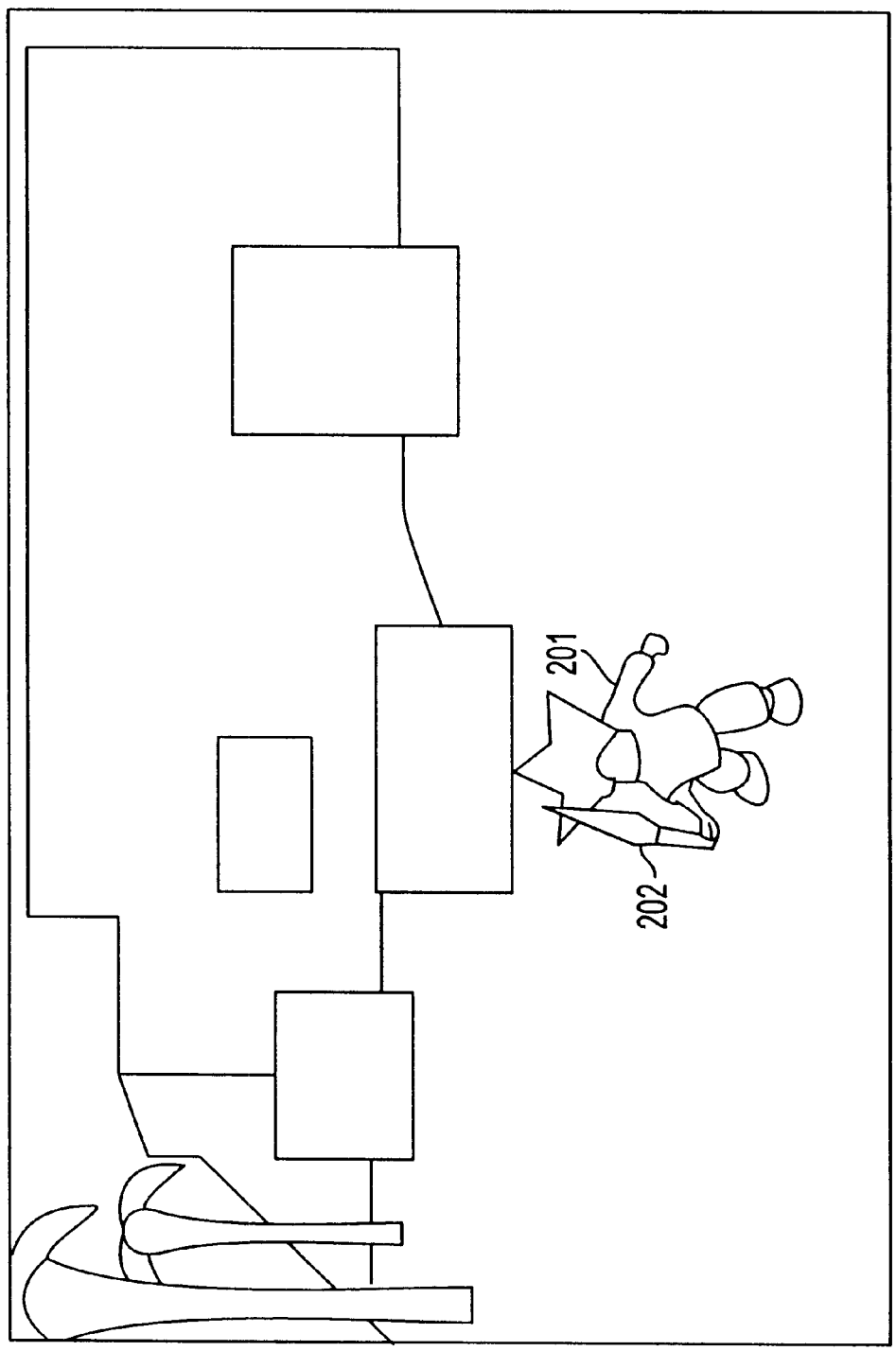
FIG. 9 is a diagram showing the display screen displaying how a player character holds a light saber at the ready.
Figure 10:
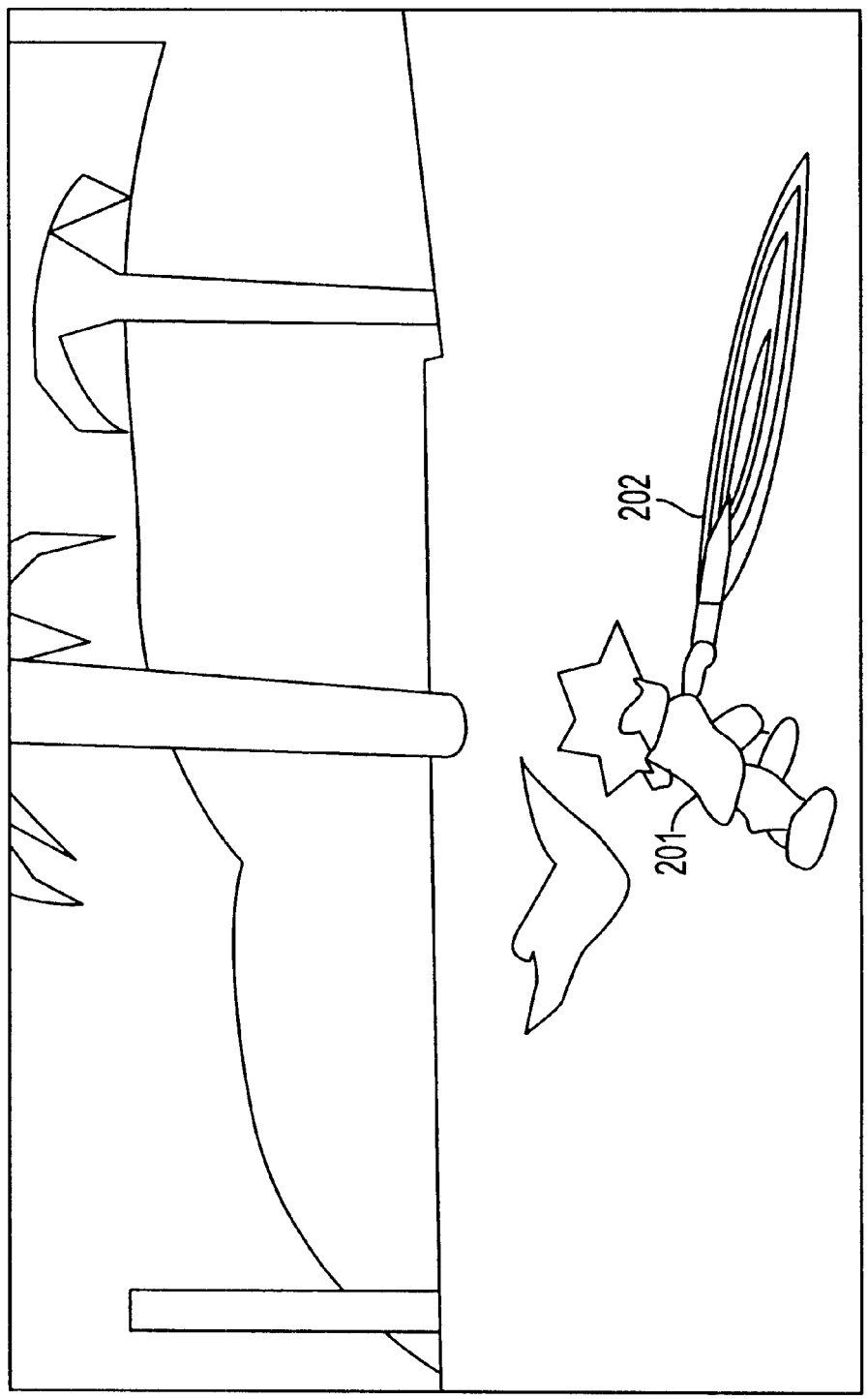
FIG. 10 is a diagram showing the display screen displaying how a player character is made to brandish a light saber.

Now a case from the time when a player character 201 is made to hold a light saber 202 at the ready position and is then made to wield it, in a plain will be described as shown in FIGS. 9 and 10.

Figures 11A, 11B:
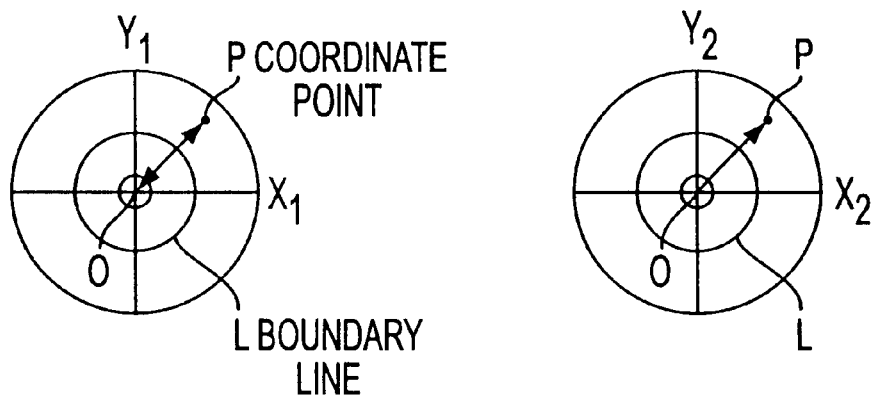
FIGS. 11(a–b) show a coordinate diagram for explaining the decision operation by the CPU from the time when a character player is made to hold a light saber in an at-the-ready stance until he is made to swing it.

In this case, CPU 31 ascertains the movement by the user of rotation operation part (left stick) 16 and rotation operation part (right stick) 17 in the coordinates of FIG. 11 and causes character 201 to perform a basic action.

Here, left stick 16 functions as a direction instruction controller that controls the movement of character 201, so character 201 is made to move in the direction of coordinate point P of each frame. The movement speed can be changed by the distance between coordinate point P and center 0. For example, the movement speed is made faster the farther the distance is. Also, the motion changes from walking to running when coordinate point P goes outside a preset boundary line L. And only if left stick 16 is pressed in center 0 is it decided that it is pressed in, and a special motion such as crouching is displayed.

Meanwhile, right stick 17 functions as an object controller that controls the object being held by character 201, in this case light saber 202, so saber 202 is swung downward in the direction when right stick 17 goes outside boundary line L. When saber 202 is swung downward, character 201 is made to face in the direction of coordinate point P until crossing boundary line L. Here, saber 202 is put back when coordinate point P enters the inside from boundary line L. Also, the speed when crossing boundary line L causes a difference in how saber 202 is swung downward. Here the speed can be detected by the amount of movement from the coordinate point n frames previously.

Figure 12:
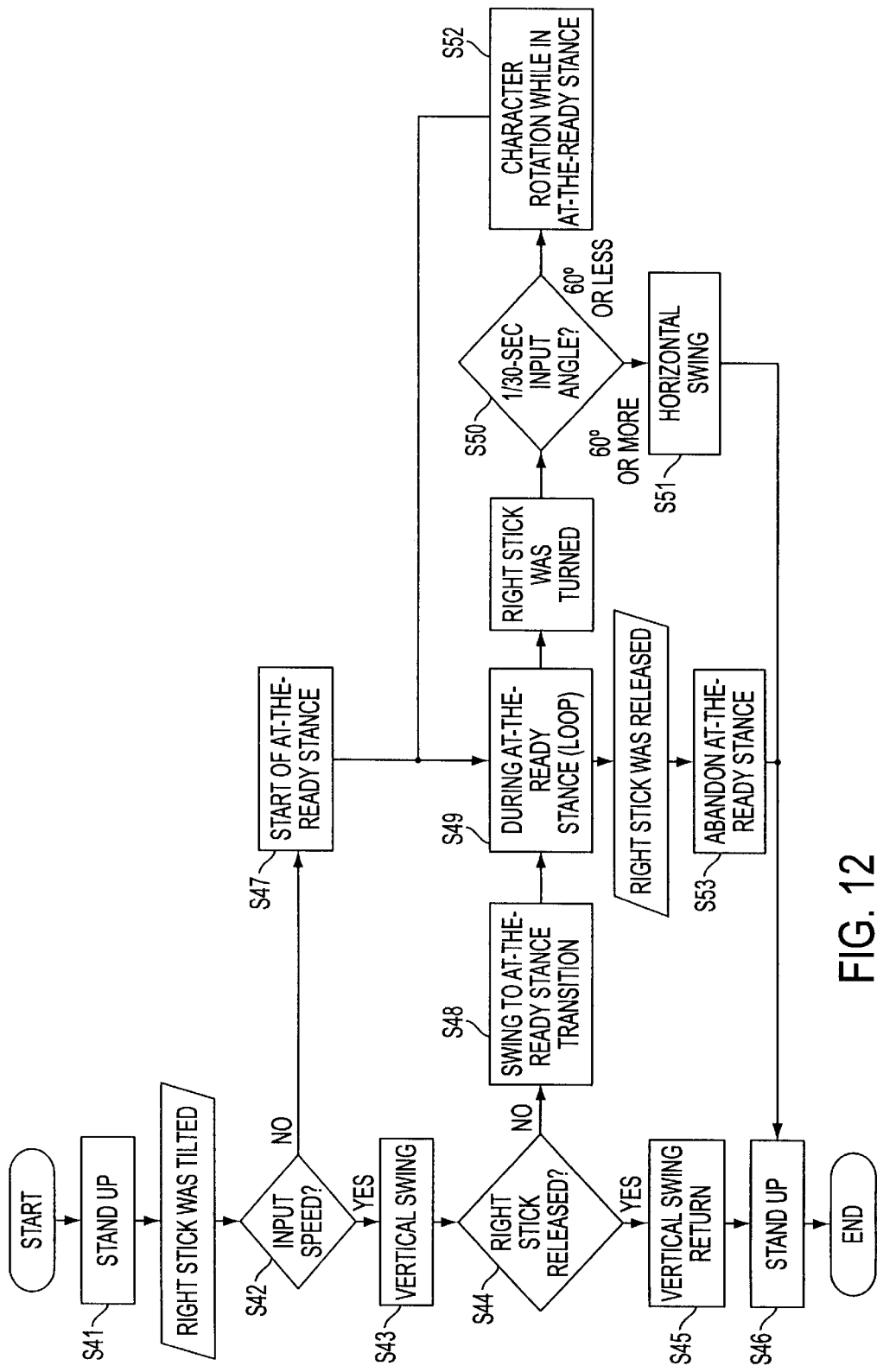
FIG. 12 is a flowchart for explaining detailed processing routines of the CPU when a player character is made to hold a light saber in an at-the-ready stance as shown in FIG. 9 and is made to swing it downward as shown in FIG. 10.

Character 201 is made to hold light saber 202 at the ready as shown in FIG. 9, and the detailed processing routine of CPU 31 when he is made to swing it downward as shown in FIG. 10 is shown in FIG. 12. In steps S41 the character is put in a standing pose by the user's operation of left stick 16. When the player tilts right stick 17, the speed of the tilt is detected in step S42; if it is fast, it proceeds to step S43 and character 201 is made to swing light saber 202 vertically while he remains in a standing pose.

Next, if in step S44 it is decided that the player is no longer touching right stick 17, it proceeds to step S45, and after light saber 202 is returned from its vertical swing, a standing pose is assumed in step S46.

On the other hand, when in step S42 it is decided that the tilting speed of right stick 17 is slow, one proceeds to step S47 and begins to make character 201 assume the at-the-ready stance. And if in step S44 it is decided that the player has not let go of right stick 17, one proceeds to step S48 and character 201 is made to perform the combined action of going from swinging to assuming the at-the-ready stance. Following the action of beginning to assume the stance in above step S47, or following the combined action in step S48, in step S49 the readiness stance is continued.

When the player thereafter turns right stick 17, the input angle of the stick of 1/30 second is detected in step S50, and if it is 60 degrees or more, one proceeds to step S51 and causes light saber 202 to be swung horizontally. If in step S50 the input angle is judged to be 60 degrees or less, one proceeds to step S52 and causes character 201 to rotate while maintaining his at-the-ready stance.

If, following the stance in step S49, the player releases right stick 17, one proceeds to step S53 and causes the at-the-ready stance to be abandoned. After step S51 and step S53, one returns to the standing pose of step S46.

During this basic action, one can use the weapon one is holding by shifting it from one hand to the other. The detection method of right stick 17 differs, with no change in the operation of left stick 16.

Figure 13A:
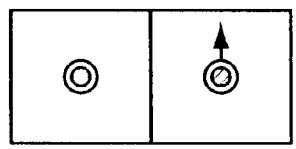
FIGS. 13(a–b) show a diagram showing the operation on the input operation device when a player character is made to handle a magic punch.
Figure 13B:
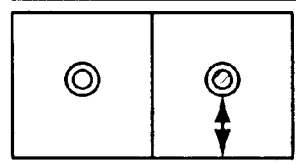
Figure 14:
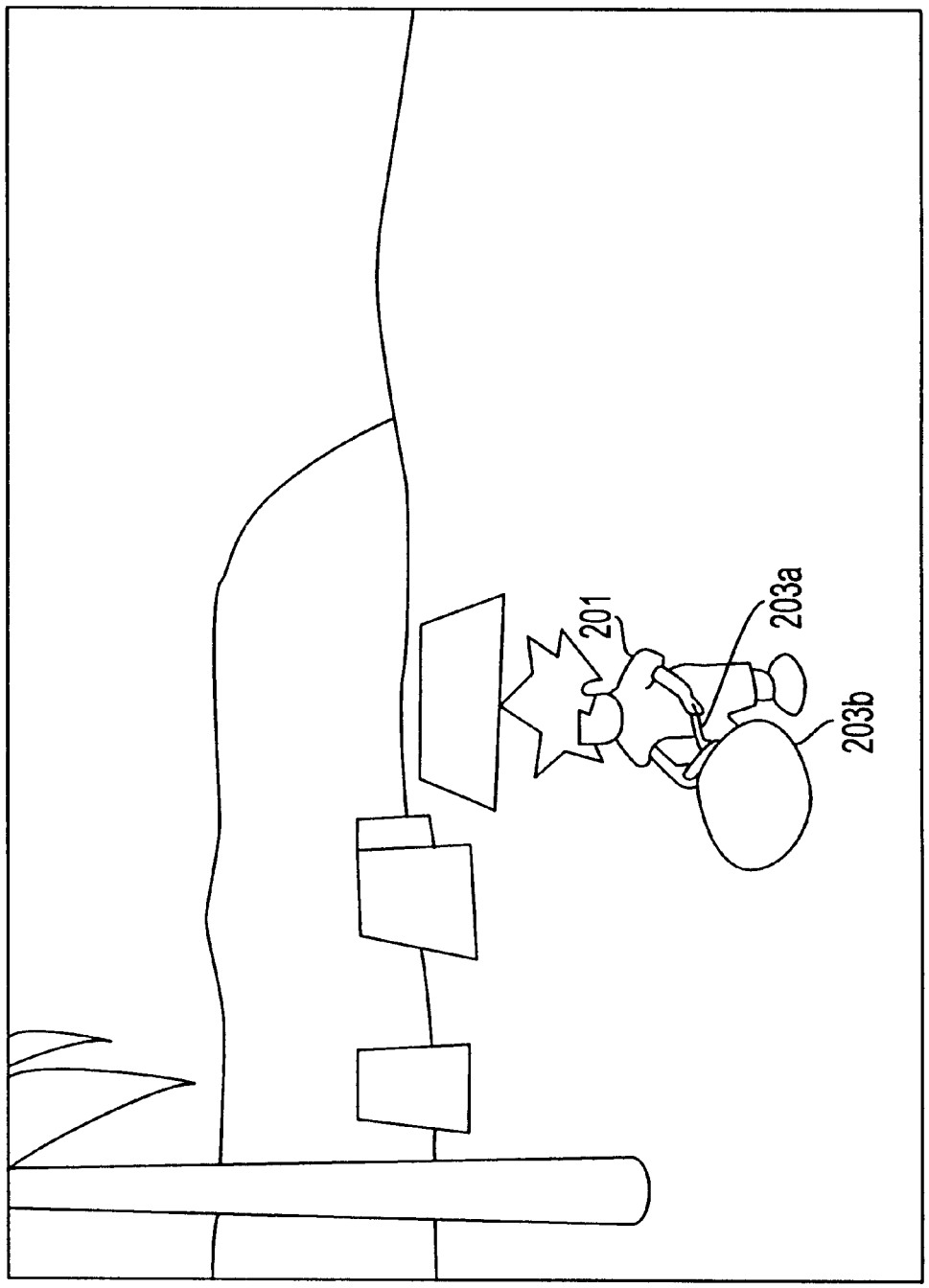
FIG. 14 is a diagram showing how a player character is made to hold a magic punch in an at-the-ready stance.
Figure 15:
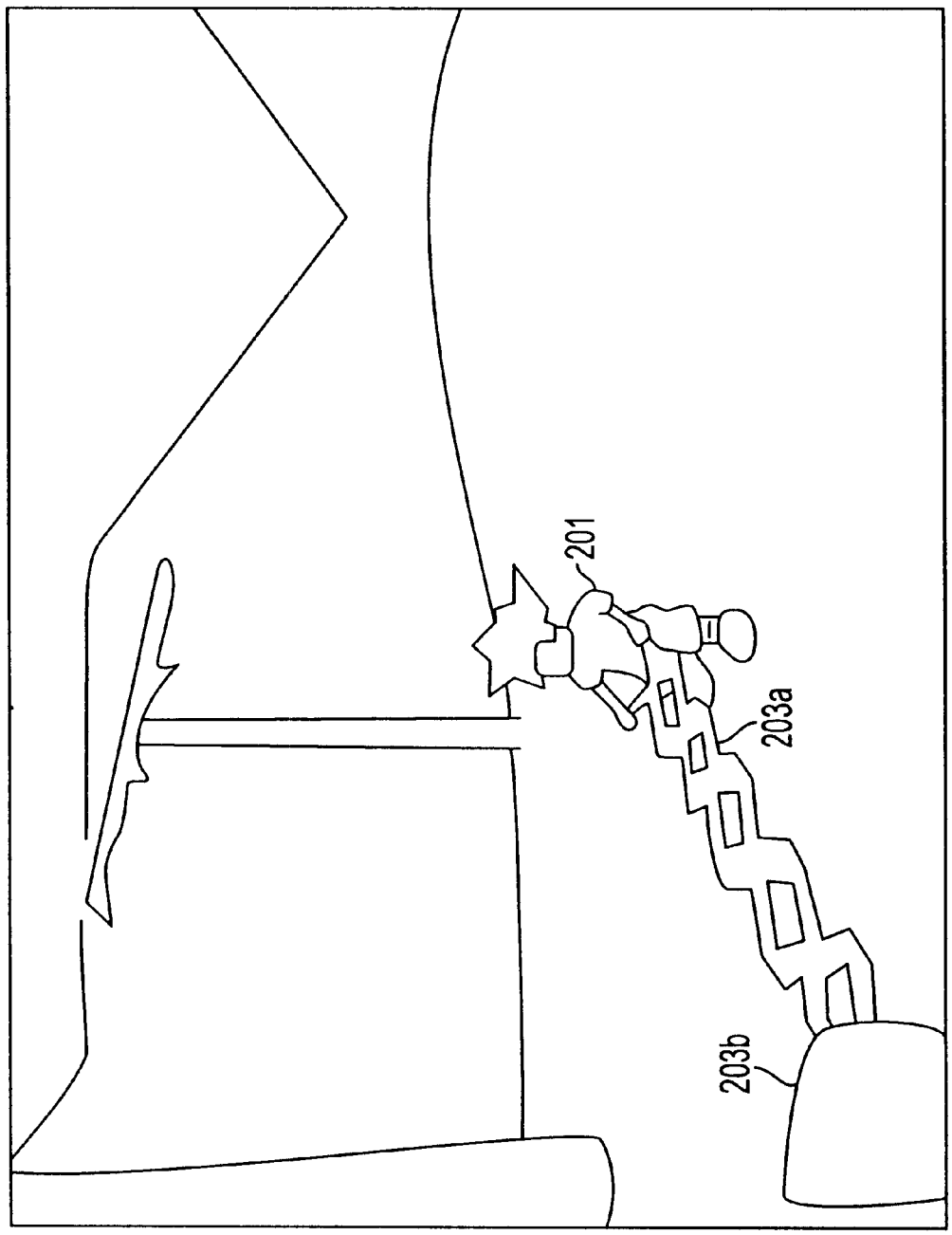
FIG. 15 is a diagram showing how a player character is made to extend a magic punch.

Next player character 201 will be allowed to hold a weapon called a magic punch, and with reference to FIGS. 13 through 15 and the action of causing this weapon to be operated will be described. The magic punch is a weapon by which an enemy character is hit from a remote position by extending the punch part that is attached to the end of the hand part. By moving right stick 17 forward as shown by the arrow in FIG. 13, hand part 203a held by character 201 shown in FIG. 14 is caused to be extended, causing punch part 203b to reach as far as a remote position, as shown in FIG. 15. To retract punch part 203b, it suffices to operate right stick 17 as shown by the arrow as shown in FIG. 13.

Figure 16A:
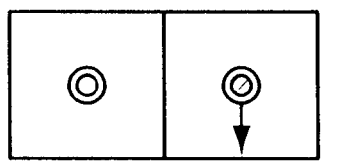
FIGS. 16(a–c) show the operation on the input operation device when a player character is made to handle a slingshot.
Figure 16B:
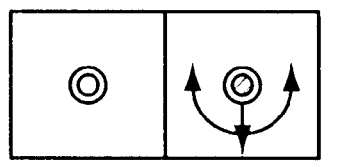
Figure 16C:
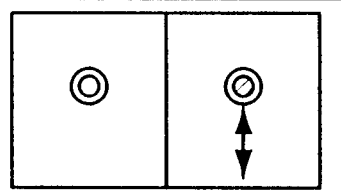
Figure 18:
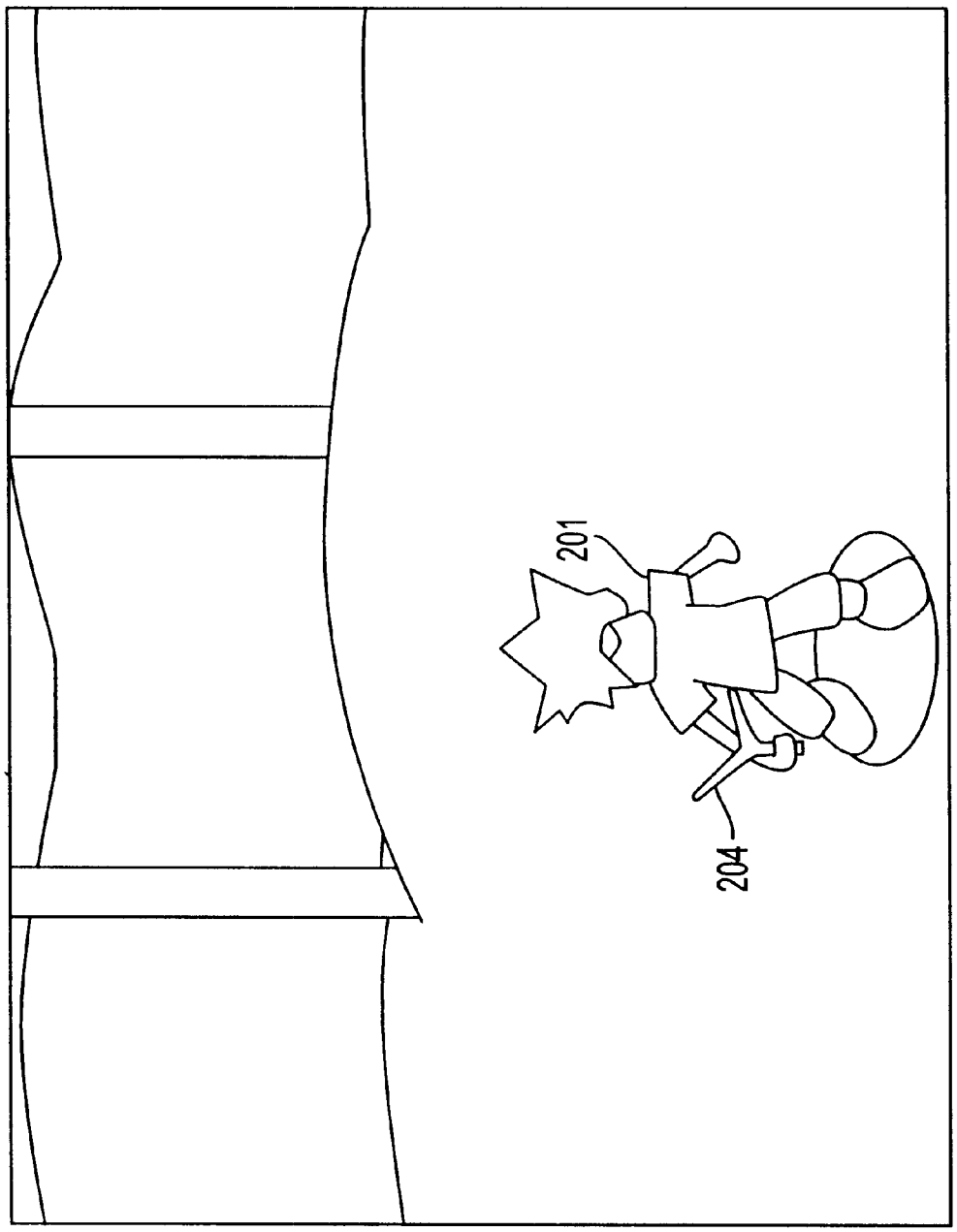
FIG. 18 is a diagram showing a scene in which a player character has finished shooting a slingshot.

Next player character 201 will be allowed to hold a weapon called a slingshot, and with FIGS. 16 through 18 and the action of causing this slingshot to be operated will be described. A slingshot is a weapon in which rubber joins the two prongs of a Y and flings, say, a stone into the distance by the impelling force of the rubber. By pulling right stick 17 as shown by the arrow in FIG. 16, character 201 is made to pull rubber 204a as shown in FIG. 17, and in this state he is moved left and right by right stick 17 to aim left and right, and when the aim is decided, right stick 17 is released, causing slingshot 204 to shoot. FIG. 18 shows the character after having shot the slingshot.

Figure 19:
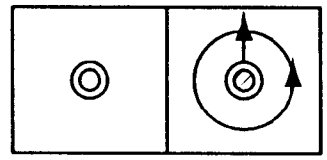
FIG. 19 is a diagram showing the operation on the input operation device when a player character is made to handle a flying dragonfly.
Figure 20:
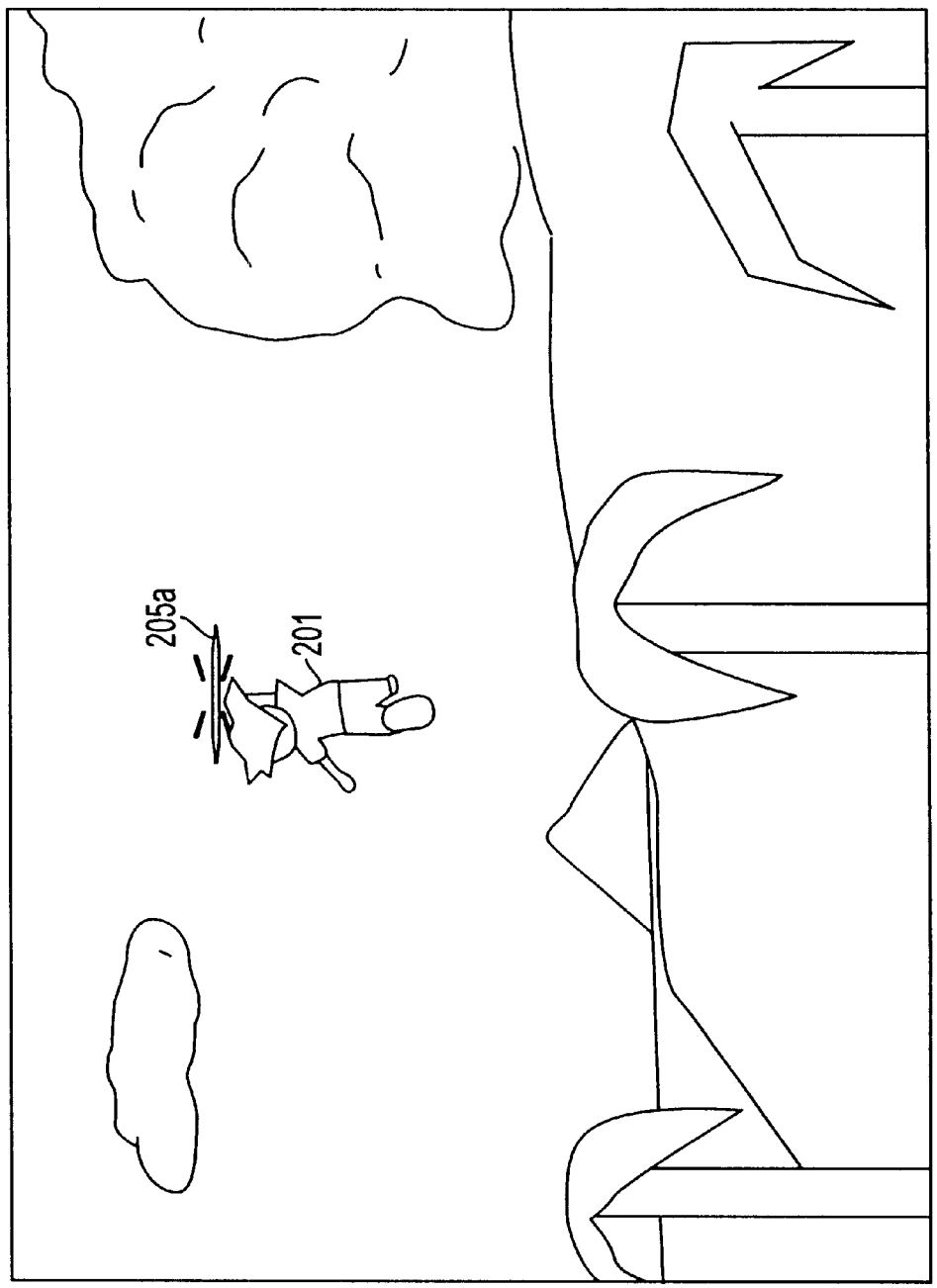
FIG. 20 is a diagram showing how a player character flies through the air using a flying dragonfly.

Next player character 201 will be allowed to hold a weapon called a flying dragonfly, and with FIGS. 19 and 20 and the action of causing this flying dragonfly to fly through the air will be described. Flying dragonfly 205 is an implement that produces buoyancy by causing propeller 205a to rotate, and it can fly through the air by having the character hold it in his hand. By turning right stick 17 as shown by the arrow in FIG. 17, propeller 205a is caused to rotate, and character 201 makes it fly through the air as shown in FIG. 20.

Figure 21A:
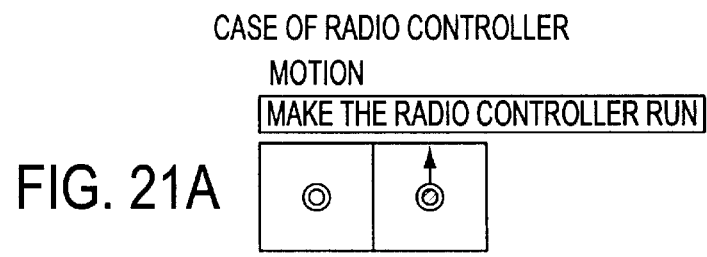
FIGS. 21(a–b) diagrammatically show the operation on the input operation device when a player character is made to handle a radio controller.
Figure 21B:
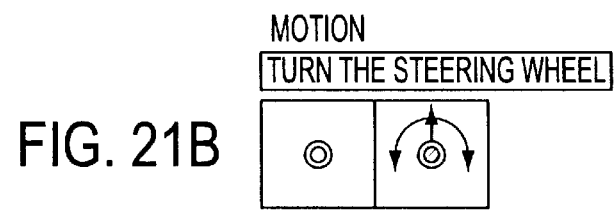
Figure 22:
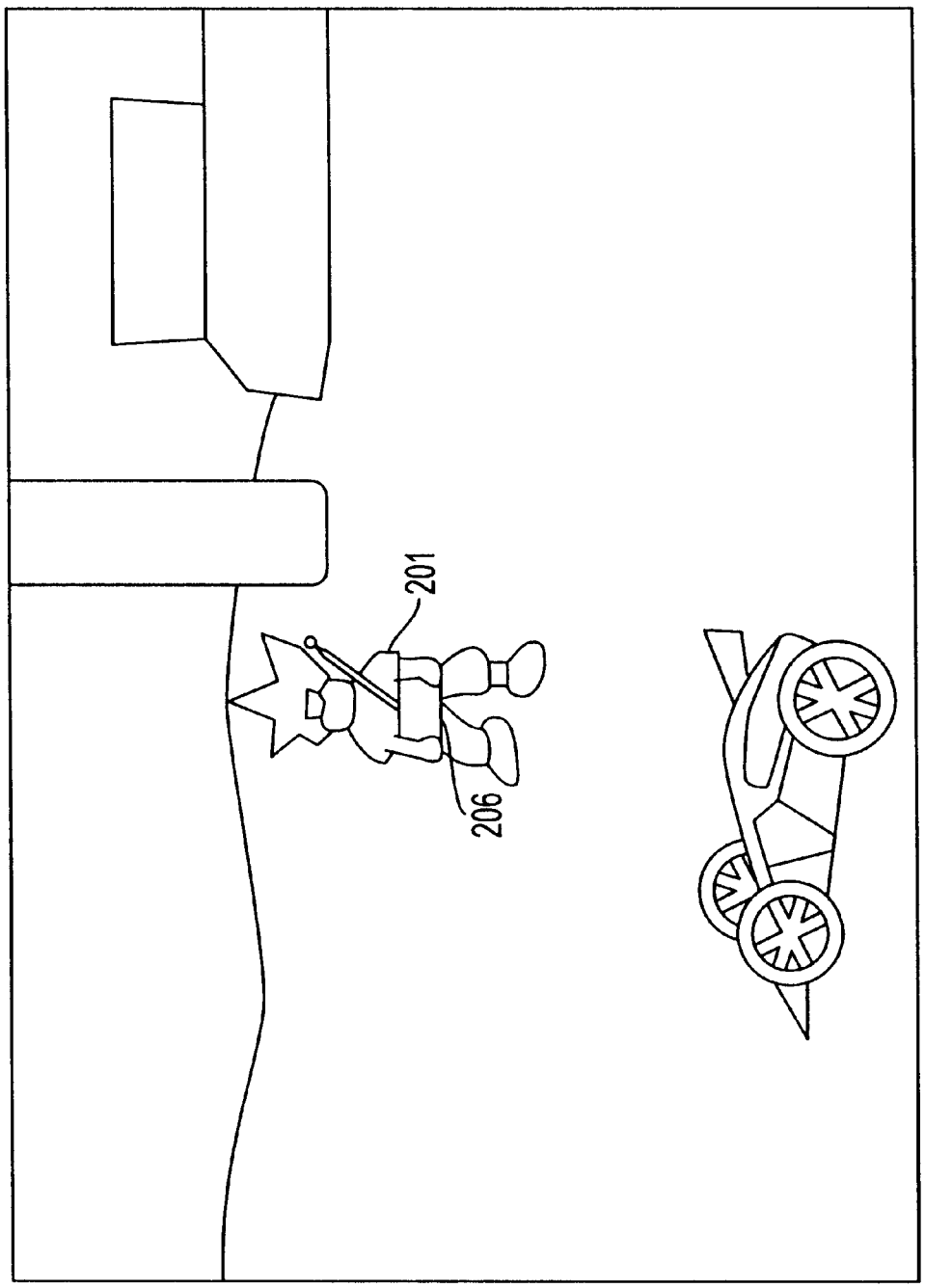
FIG. 22 is a diagram showing how a player character moves a radio-controlled car using a radio controller.

Next, player character 201 will be allowed to hold a radio controller, and with FIGS. 21 and 22 and the action of making a car move with this radio controller will be described. Here the car (radio-controlled car) runs in the direction in which right stick 17 is tilted. That is, if the right stick 17 is tilted straight forward as shown by the arrow in FIG. 21, the radio-controlled car proceeds straight forward, and if right stick 17 is moved right or left as shown by the arrow, the radio-controlled car runs with its steering wheel turned right or left. FIG. 22 shows a scene in which player character 201 is operating radio controller 206.

Figure 23:
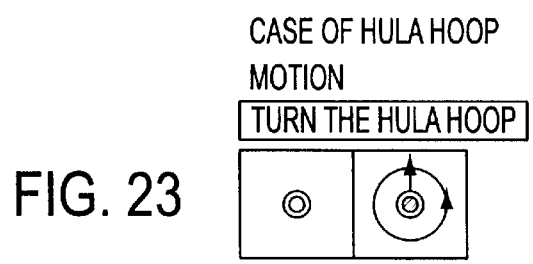
FIG. 23 is a diagram showing the operation on the input operation device when a player character is made to turn a hula hoop.
Figure 24A:
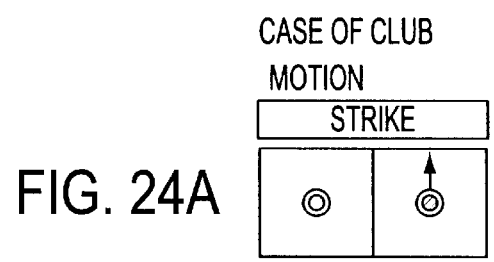
FIGS. 24(a–b) show a diagram of the operation on the input operation device when a player character is made to handle a club.
Figure 24B:
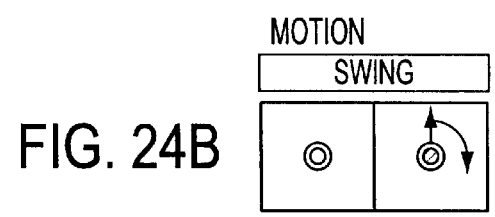

Also, with the present invention, if the right stick is turned as shown by the arrow in FIG. 23, the player character can be made to turn a hula hoop. And by allowing the character to hold a club and operating the right stick as in FIG. 24, the character can be made to perform actions with the club such as striking and swinging.

Figure 25:
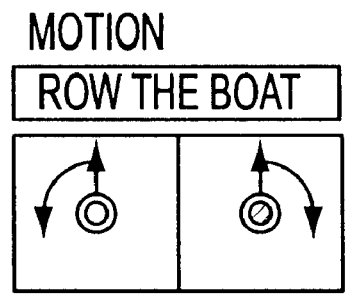
FIG. 25 is a diagram showing the operation on the input operation device when a player character is image to row a boat.

Putting the player character in a rowboat, the character can be made to row the boat by moving left stick 16 and right stick 17 as in FIG. 25. In this case, the movement of coordinate Y1 shown in FIG. 6 is synchronized with the movement of the left-side oar. Also, the movement of coordinate X1 is synchronized with the angle in the vertical direction of the left-side oar. For example, with a negative value the oar goes into the water, and with a positive value the oar comes out of the water. Also, the movement of coordinate Y2 is synchronized with the movement of the right-side oar, and the movement of coordinate X2 is synchronized with the angle in the vertical direction of the right-side oar. As above, with a negative value the oar goes into the water, and with a positive value the oar comes out of the water.

Figure 26A:
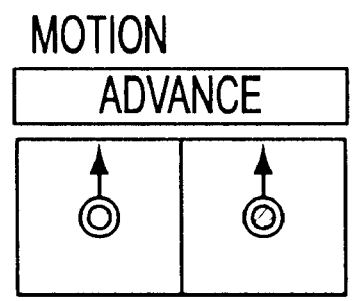
FIGS. 26(a–e) show a diagram of the operation on the input operation device when one moves a tank in which a player character is riding.
Figure 26B:
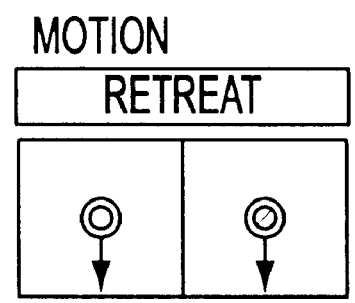
Figure 26C:
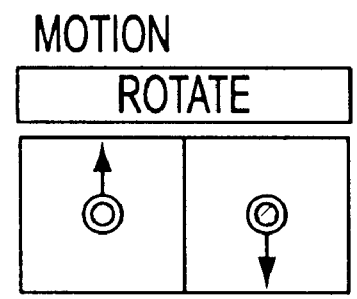
Figure 27A:
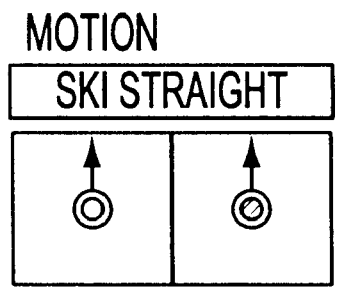
FIGS. 27(a–d) show a diagram of the operation on the input operation device when a player character is made to ski.
Figure 27B:
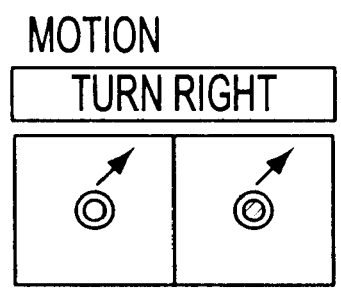
Figure 27C:
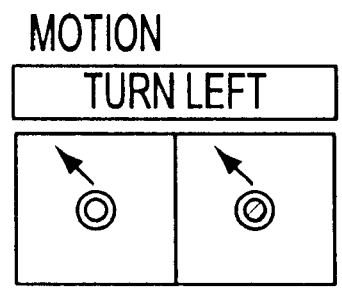
Figure 27D:
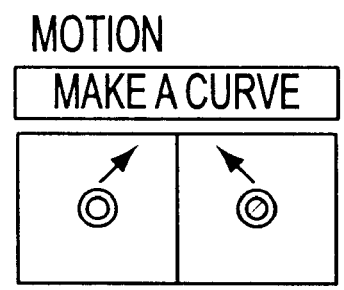

Putting the player in a vehicle having a caterpillar track (for example, a tank), the vehicle carrying the character can be made to advance, retreat, or revolve by operating left stick 16 and right stick 17 as shown in FIG. 26. In this case, the value of coordinate Y1 shown in FIG. 6 is proportional to the speed of movement of the left caterpillar. A negative represents a speed of retreat. The value of coordinate X1 is ignored. Similarly, the value of coordinate Y2 is proportional to the speed of movement of the right caterpillar. Here too, the value of coordinate X2 is ignored.

Putting the character on skis, the ski-wearing character can be made to ski straight, turn left, turn right, or make a curve by operating left stick 16 and right stick 17 as shown in FIG. 27. In this case, the angle difference of the coordinate point from the Y1 axis shown in FIG. 6 is synchronized to the angle of the left ski. The first and fourth quadrants are toward the inside, and the second and third quadrants are toward the outside. Also, the angle difference of the coordinate point from the Y2 axis is synchronized to the angle of the right ski. The second and third quadrants are toward the inside, and the first and fourth quadrants are toward the outside. The speed at which the skis glide varies depending on the distance from center 0 to coordinate point P. If the Y value is negative, the speed is set to 0.

As described above, with the video game device 1 an application program that can cause characters in game space to handle objects by having the player make on an operation device a movement that is related to how an object is actually handled is read from CD-ROM and is stored in main memory 33 and the application program is executed by CPU 31, so the user's interface for allowing a character to handle an object can be improved, and operation by the user can be simplified.

In the above-described embodiment, said application program is recorded on a CD-ROM or other recording medium, and the game is played by mounting this recording medium. By contrast, it is also possible to play the aforesaid game by taking in the aforesaid application program via, for example, a network, and storing it in a memory medium such as the main memory 33. In the hardware configuration in this case, for example in video game device 1 of FIG. 1, a network is connected instead of optical disk controller 80.

The present invention makes it possible for the player, by making with respect to an operation device a movement that is related to how an object is actually handled, to have a character in game space handle an object, which can improve the user interface for having characters handle objects and can simplify operation by the user.

It is to be understood that the embodiments and variations shown and described above are illustrative of the principles of this invention only and that various modifications may be implemented by those skilled in the art without departing from the scope and spirit of the invention.

What is claimed is:

1. The entertainment system in which a player plays a game by causing a prescribed character handling an object on a display screen of the entertainment system to act as intended, the entertainment system comprising:
an input operation means by which commands by the player are inputted;
a memory medium for storing a program, said program further composing a character handling an object, said program enabling moving of the object of the character in a game space by having the player replicate on said input operation means a movement which is related to how the object is actually handled, so as to operate said character;
a control means for controlling actions of said object handled by the character prescribed on the display screen based on said program stored in said memory medium and commands from said input operation means,
wherein said input operation means has at least two operation parts,
wherein one of said at least two operation parts is a first operation part that controls the movement of the character; and
wherein another of said at least two operation parts is a second operation part that controls the object being held by the character.

2. The entertainment system as described in claim 1, wherein said control means detects the quantity of two-dimensional movement of an operation part of said input operation means and analogously moves said object.

3. The entertainment system as described in claim 1, wherein said input operation means has two operation parts.

4. The entertainment system as described in claim 1, wherein said memory medium reads said program from a recording medium on which said program is recorded and stores it.

5. The entertainment system as described in claim 1, wherein said memory medium takes in said program via a communication means and stores it.

6. The entertainment system according to claim 1, wherein said input operation means further comprises an operation unit that controls the movement of the character.

7. The entertainment system according to claim 6, wherein said operation unit further comprises four switching parts which are arranged mutually perpendicularly.

8. The entertainment system according to claim 7, wherein at least one of said four switching parts is selectively switched so that a direction of the movement of the character corresponds to the arrangement of said switching pans when one of said four switching parts is pushed.

9. The entertainment system according to claim 1, wherein said input operation means further comprises an operation unit having four push operation parts which are arranged mutually perpendicularly and switch elements as signal input elements that respectively correspond to each of said push operation parts; and
wherein the operation unit sets the function of the character allocated to each of said push operation pans by tuning on said switch elements that correspond to each of said push operation pans.

10. The entertainment system according to claim 9, wherein said operation unit executes the function that the character has by turning on said switch elements that correspond to each of said push operation parts.

11. The entertainment system according to claim 1, wherein said input operation means further comprises an operation unit having four push operation parts which are arranged mutually perpendicularly and switch elements as signal input elements that respectively correspond to each of said push operation parts; and
wherein the operation unit executes the function that the character has by turning on said switch elements that correspond to each of said push operation parts.

12. The entertainment system according to claim 1, wherein said input operation means further comprises:
a first operation unit,
a second operation unit,
said first operation unit functions as a direction instruction controller that controls the movement of the character and has four push operation parts which are arranged mutually perpendicularly, and switch elements as signal input elements that respectively correspond to each of said push operation parts, wherein by selectively pressing each of said push operation parts and turning on and off said switch elements that respectively correspond to said push operation parts, the character is caused to move in the direction of the arrangement of the pressed said push operation parts, and wherein said second operation unit has four push operation parts which are arranged mutually perpendicularly and switch elements as signal input elements that respectively correspond to each of said push operation parts, and wherein said second operation unit is used as a function setting execution unit that sets the function of the character allocated to each of said push operation parts, or that executes the function that the character has, by turning on said switch elements that respectively correspond to said push operation parts.

13. The entertainment system according to claim 1, wherein said input operation means further comprises a rotation operation part that controls the movement of the character.

14. The entertainment system according to claim 1, wherein said input operation means further comprises a rotation operation part that controls the movement of the character and which can be rotated 360 degrees about an operation axis.

15. The entertainment system according to claim 14, wherein said control means detects a variation in the movement of said rotation operation part, and determines the action pattern according to the variation of the movement, and controls the character.

16. The entertainment system according to claim 1, wherein said input operation means further comprises a rotation operation part that controls the object being held by the character.

17. The entertainment system according to claim 1, wherein said input operation means further comprises a rotation operation pan that controls the object being held by the character and which can be rotated 360 degrees about an operation axis.

18. The entertainment system according to claim 17, wherein said control means detects a variation in the movement of said rotation operation part, and determines the action pattern according to the variation of the movement, and controls the character.

19. The entertainment system according to claim 1, wherein said control means changes an operation of the object.

* * * * *